US009774701B2

(12) United States Patent
Cho et al.

(10) Patent No.: US 9,774,701 B2
(45) Date of Patent: Sep. 26, 2017

(54) APPARATUS AND METHOD OF TERMINAL FOR MANAGING SERVICE PROVIDED FROM SERVER

(71) Applicant: Samsung Electronics Co., Ltd, Gyeonggi-do (KR)

(72) Inventors: Kyu-Nam Cho, Seoul (KR); Jae-Chul Yang, Gyeonggi-do (KR); Hee-Seok Jeong, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 268 days.

(21) Appl. No.: 13/744,150

(22) Filed: Jan. 17, 2013

(65) Prior Publication Data
US 2013/0185392 A1    Jul. 18, 2013

(30) Foreign Application Priority Data
Jan. 17, 2012 (KR) .................. 10-2012-0005265

(51) Int. Cl.
| | |
|---|---|
| G06F 15/16 | (2006.01) |
| H04L 29/06 | (2006.01) |
| H04L 29/08 | (2006.01) |
| H04L 12/24 | (2006.01) |

(52) U.S. Cl.
CPC .......... *H04L 67/42* (2013.01); *H04L 41/5054* (2013.01); *H04L 67/2809* (2013.01)

(58) Field of Classification Search
CPC ...................................... H04L 67/02
USPC ....................................... 709/217
See application file for complete search history.

(56) References Cited

U.S. PATENT DOCUMENTS

| | | | | |
|---|---|---|---|---|
| 7,711,812 B2* | 5/2010 | Rosu | ...................... | G06Q 10/10 709/224 |
| 7,822,778 B1* | 10/2010 | Von Riegen | ...... | G06F 17/30864 707/802 |
| 2002/0099772 A1* | 7/2002 | Deshpande | ............. | H04L 63/10 709/204 |
| 2004/0030627 A1* | 2/2004 | Sedukhin | ............... | G06Q 40/00 705/36 R |
| 2004/0073661 A1* | 4/2004 | Eibach | ............... | G06Q 30/0283 709/224 |
| 2004/0267876 A1* | 12/2004 | Kakivaya | ................ | H04L 67/16 709/200 |
| 2006/0179150 A1* | 8/2006 | Farley | .................... | H04L 12/24 709/228 |
| 2007/0078860 A1* | 4/2007 | Enenkiel | ............. | H04L 67/1008 |
| 2007/0106673 A1* | 5/2007 | Enenkiel | ........... | H04L 29/12009 |
| 2007/0136236 A1* | 6/2007 | Kussmaul | ........... | G06F 17/3089 |

(Continued)

OTHER PUBLICATIONS

Geyer, Carol. 'tModels', UDDI XML.org website [online]. XML. org, Jun. 21, 2007 [retrieved on Nov 21, 2016]. Retrieved from the Internet: <URL:http://uddi.xml.org/tmodels>.*

(Continued)

*Primary Examiner* — Kevin Bates
*Assistant Examiner* — Dae Kim

(57) ABSTRACT

An apparatus of a terminal performs an operation method of the terminal using a cloud system. The method includes sending a request for information of a server providing a specific service, to at least one broker. The method also includes receiving the information of the server from the broker, and sending a request for the specific service to the server, using the information of the server.

18 Claims, 8 Drawing Sheets

(56) References Cited

U.S. PATENT DOCUMENTS

| | | | |
|---|---|---|---|
| 2010/0211631 A1* | 8/2010 | Lee .................. | H04L 29/12113 709/203 |
| 2011/0145094 A1 | 6/2011 | Dawson et al. | |
| 2011/0161477 A1 | 6/2011 | Kowalski | |
| 2011/0314082 A1 | 12/2011 | Koneti et al. | |
| 2012/0042040 A1* | 2/2012 | Bailey .................. | G06F 9/5055 709/217 |
| 2012/0131135 A1* | 5/2012 | Yamuna .................. | G06F 9/541 709/217 |

OTHER PUBLICATIONS

International Search Report dated Apr. 30, 2013 in connection with International Patent Application No. PCT/KR2013/000093, 3 pages.
Written Opinion of the International Searching Authority dated Apr. 30, 2013 in connection with International Patent Application No. PCT/KR2013/000093, 5 pages.
R. Buyya et al., "InterCloud: Utility-Oriented Federation of Cloud Computing Environments for Scaling of Application Services", In the Proc. of the 10th 1CA3PP, Dec. 2010, vol. 1, pp. 13-31.

\* cited by examiner

APPARATUS AND METHOD OF TERMINAL FOR MANAGING SERVICE PROVIDED FROM SERVER

CROSS-REFERENCE TO RELATED APPLICATION(S) AND CLAIM OF PRIORITY

The present application is related to and claims priority under 35 U.S.C. §119(a) to a Korean Patent Application filed in the Korean Intellectual Property Office on Jan. 17, 2012 and assigned Serial No. 10-2012-0005265, the contents of which are herein incorporated by reference.

TECHNICAL FIELD OF THE INVENTION

The present disclosure relates to an apparatus and method of a terminal for managing a service provided from a server.

BACKGROUND OF THE INVENTION

The growth of cloud computing technology has made it possible to receive and store files from a local device to a server and from the server to the local device, respectively. For instance, a user no longer is required to individually manage and store, in the local device, various large capacity files of the local device. Instead, the user can send and store the various large capacity files from the local device to the server and, if necessary, again receive and store the files from the server to the local device, using a cloud system. Also, cloud computing has made it possible for the server to register a new service as well as an existing service and provide various services to the local device.

However, the conventional art had to manufacture a new module in order to add a new service, and had to passively connect the new module in order to provide the added service to the local device. That is, the conventional art has a problem that it has to passively connect the module, which is manufactured to add the new service, to the local device and the server. This problem is also incurred when adding a similar service as well as when adding a new service.

SUMMARY OF THE INVENTION

To address the above-discussed deficiencies of the prior art, it is a primary object to provide at least the advantages below. Accordingly, one aspect of the present disclosure is to provide an apparatus and method for allowing a client to know, through a broker, information about a service provided from a server, thereby reducing a load of the server.

Another aspect of the present disclosure is to provide an apparatus and method for making communication protocols used in a client, a broker, and a server identical and, making unnecessary a great change of an existing used system, even when a new service is added, thereby improving a user convenience.

A further aspect of the present disclosure is to provide an apparatus and method for making communication modules used in a broker and a server identical, thereby reducing additional work for communication even when a new service is added.

The above aspects are achieved by providing an apparatus and method of a terminal for managing a service provided from a server.

According to one aspect of the present disclosure, an operation method of a terminal is provided. The method includes sending a request for information of a server providing a specific service, to at least one broker. The method also includes receiving the information of the server from the broker, and sending a request for the specific service to the server, using the information of the server.

According to another aspect of the present disclosure, an operation method of a broker is provided. The method includes receiving a request for information of a server providing a specific service, from a terminal, and transmitting the information of the server to the terminal.

According to a further another aspect of the present disclosure, an operation method of a server is provided. The method includes transmitting server information about a specific service provided from the server, to at least one broker. The method also includes receiving a request for provision of the specific service from the terminal, and providing the specific service to the terminal.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. Preferred embodiments of the present disclosure will be described herein below with reference to the accompanying drawings. In the following description, well-known functions or constructions are not described in detail since they would obscure the disclosure in unnecessary detail. Also, parts performing like function and operations are denoted by the same symbols throughout the drawings.

Figure 1:
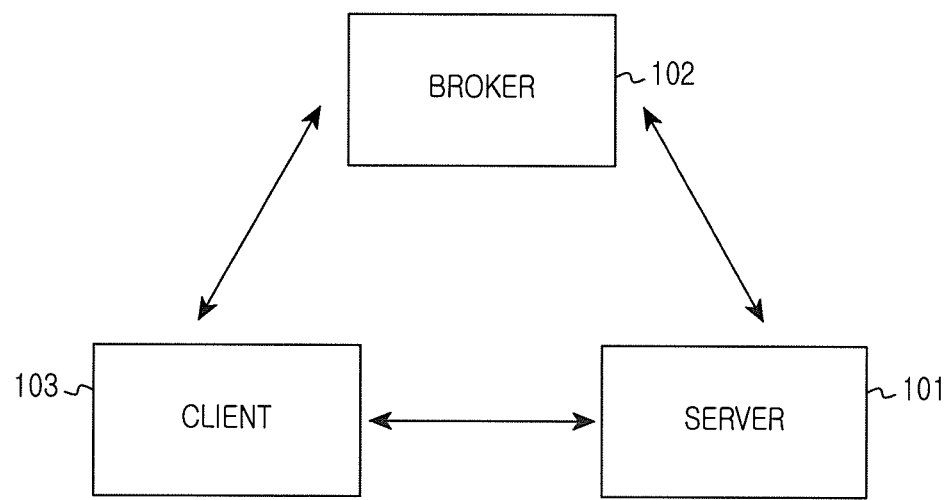
FIG. 1 is a block diagram illustrating a system composed of a client (i.e., terminal), a broker, and a server according to an embodiment of the present disclosure.

FIG. 1 is a block diagram illustrating a system composed of a client (i.e., terminal), a broker, and a server according to an embodiment of the present disclosure.

As illustrated in FIG. 1, the system can include a server 101, a broker 102, and a client 103.

The server 101 provides various services to the client 103 in a Web or a cloud system. In more detail, the server 101 stores one or more several services provided by a service provider and, after receiving a request for a specific service from the client 103, the server 101 provides the requested service to the client 103. The server 101 has stored one or more service modules capable of individually operating each service provided by the service provider. That is, the server 101 individually modularizes each service and, if the server 101 receives a request for provision of a service from the client 103, a requested service module individually operates and provides the service to the client 103.

Although described later, the present disclosure has a feature of reducing a load applied to the server 101 by placing the broker 102 between the server 101 and the client 103. That is, the conventional art transmitted/received a specific file or specific information through communication between a server and a client. However, embodiments of the present disclosure are capable of reducing a load applied to the server 101 by placing a broker 102 inside the server 101 or outside the server 101. In more detail, if the server 101 sends a request for register of each service module stored in the server 101 to the broker 102, the broker 102 determines if one or more service modules requested by the server 101 have been previously stored in the server 101 and, if it is determined that the service modules have not been previously stored in the server 101, the broker 102 grants identification numbers to the service modules not stored in the server 101. That is, a corresponding identification number includes position information of each service module and service information thereof, so the client 103 can receive position information and service information of a service module with which the client 103 desires to be provided (i.e., information of the server 101 providing a specific service), through the broker 102 not the server 101. Accordingly, the client 103 can receive the information of the server 101 providing the specific service, through one or more brokers 102, thereby being capable of reducing a load applied to the server 101.

Here, the information of the server 101 may include position information of a specific service module and service information thereof. That is, the information of the server 101 is defined as including individual position information of each of one or more service modules stored in the server 101 and individual service information thereof. Therefore, in the present disclosure, to get a specific service from the server 101, the client 103 first has access to the broker 102 and receives position information and service information about a service of interest from the broker 102. Of the information of the server 101, the position information is defined as including at least one of Internet Protocol (IP) information of a service module, port information thereof, and Uniform Resource Locator (URL) information thereof. That is, port information and URL information of a service module that the client 103 desires among several service modules stored in the server 101 can differ, so the client 103 cannot gain access to the service module until receiving each information from the broker 102. Of the information of the server 101, the service information is defined as including a title of a service provided by a corresponding service module, the content of the service, a capacity of the service, and the like. That is, detailed items are included in a service module selected by the client 103, so the client 103 can receive service information of the selected service module from the broker 102 and confirm the content of a service of the selected service module in more detail.

The broker 102 stores information of one or more servers providing specific services and, after receiving a request for information of a specific server from the client 103, transmits the requested information of the specific server to the client 103. In more detail, if the broker 102 receives a request for registering each service module stored in the server 101 from the server 101, the broker 102 determines if one or more service modules requested by the server 101 have been previously stored in the server 101. If it is determined that the service modules have not been previously stored in the server 101, the broker 102 grants identification numbers to the service modules not stored in the server 101. That is, a corresponding identification number includes position information of each service module and service information thereof, so the client 103 can receive position information and service information of a service module with which the client 103 desires to be provided, i.e., information of the server 101 providing a specific service, through the broker 102 not the server 101. Accordingly, the client 103 can receive the information of the server 101 providing the specific service, through one or more brokers 102, thereby being capable of reducing a load applied to the server 101.

If the information of the server 101 is changed, the broker 102 again grants a new identification number including the changed information of the server 101 to the server 101. For example, when a service provider stops providing a specific service, when the service provider is changed, or when a physical position of the server 101 is changed, the information of the server 101 can be changed. Therefore, after the client 103 temporarily stops an initially provided service, the client 103 receives changed position information of a service module from the broker 102 so as to seamlessly get the stopped service from the server 101 later.

The client 103 receives information of the server 101 providing a specific service, from the broker 102, gains access to a specific service module positioned in the server 101 using the received information of the server 101, and gets the specific service from the server 101. In more detail, the client 103 first has access to the broker 102 and receives the information of the server 101 stored in the broker 102 from the broker 102. That is, the client 103 can have access to a specific service module that the client 103 desires among several service modules stored in the server 101, using the information of the server 101 received from the broker 102. Accordingly, the client 103 can receive the information of the server 101 providing the specific service through one or more brokers 102, thereby being capable of reducing a load applied to the server 101.

In the present disclosure, the server 101, the broker 102, and the client 103 use the same communication protocol. In more detail, the conventional art had to manufacture a new module to add a new service, and had to passively connect the manufactured module in order to provide the added service to a client. That is, the conventional art had a problem that it had to passively connect the module, which is manufactured to add the new service, to the client and a server. This problem was the same when adding a similar service as well as when adding a new service. In contrast, as described above, embodiments of the present disclosure make communication protocols used in the client 103, the broker 102, and the server 101 identical and, even when a new service is added, making unnecessary a great change of an existing used system, thereby providing an advantage of improving a user convenience. Also, embodiments of the present disclosure make communication modules used in the broker 102 and the server 101 identical, thereby providing an advantage of being capable of reducing an additional work for communication even when a new service is added. In more detail, each service module positioned in the server 101 and a communication module of the broker 102 positioned inside the server 101 or outside the server 101 are composed of an Inter-Process Communication (IPC) module and a Remote Procedure Call (RPC) module, respectively. The IPC module is used for communication between service modules positioned inside the same server and communication between the service module and the broker 102. The RPC module is used for communication between the broker 102 and the service module when the broker 102 is positioned outside the server 101.

Figure 2:
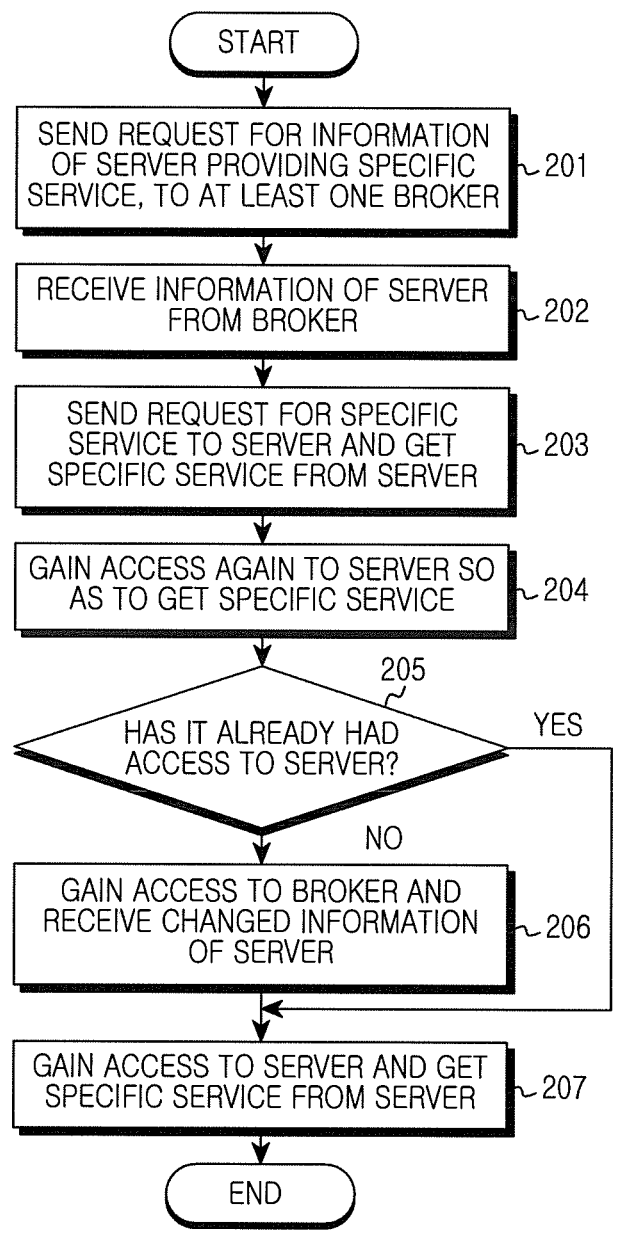
FIG. 2 is a flowchart illustrating an operation method of a client for managing a service provided from a server according to an embodiment of the present disclosure.

FIG. 2 is a flowchart illustrating an operation method of a client for managing a service provided from a server according to an embodiment of the present disclosure.

As illustrated in FIG. 2, in block 201, a client sends a request for information of a server providing a specific service, to at least one broker. In more detail, the client sends the request for the information of the server to the broker in order to get the specific service stored in the server from the server. That is, in the conventional art, the client has access directly to the server and gets a specific service stored in the server from the server. In contrast, in the present disclosure, the broker has stored information about a specific service provided from the server and accordingly, to gain access to the server, the client first has access to the broker and sends a request for server information of interest to the broker. Here, the information of the server includes position information of a specific service module and service information thereof. That is, the information of the server is defined as including individual position information and individual service information of each of one or more service modules stored in the server. Of the information of the server, the position information is defined as including at least one of IP information of a service module, port information thereof, and URL information thereof. Of the information of the server, the service information is defined as including a title of a service provided by a corresponding service module, the content of the service, a capacity of the service, and the like.

After sending the request for the information of the server providing the specific service, to the at least one broker in block 201, in block 202, the client receives the information of the server from the broker. As described above, the client receives corresponding server information stored in the broker, from the broker so as to get the specific service from the server. Accordingly, the client receives information about a specific server through the broker without having direct access to the specific server. Thus, the present disclosure has an advantage of being able to reduce a load of the specific server compared to the conventional art.

If the client receives the information of the server from the broker in block 202, in block 203, the client sends a request for a specific service to the server and gets the specific service from the server. In more detail, the client can receive service information among specific server information that the client has requested to the broker, from the broker, and confirm the detailed content of the specific service. The client can also receive position information among the specific server information from the broker, gain access to a service module providing the specific service, and get the specific service from the server.

Below, it is assumed that the client has access again to the server so as to get the specific service from the server in block 204. For instance, it may be a situation where, after getting a specific service, the client temporarily stops the specific service and then has access again to the server, or may be a situation where the client has access to the server so as to get a specific service again.

If the client has access again to the server so as to get the specific service from the server in block 204, in block 205, the client determines if it has already had access to the server. The reason why the client goes through the above-described determination process is to determine if information of the server providing the specific service has been changed. That is, when the client attempts access to the server, if the access to the server fails, the client determines if the failure reason is simple communication interruptions or is the change of the information of the server. For instance, when a service provider providing a corresponding service stops providing the service, or the service provider is changed, or a physical position of the server is changed, the access of the client to the server fails.

If it is determined in block 205 that the client attempts the access to the server but the access to the server fails, in block 206, the client has access to the broker and receives the changed information of the server from the broker. In more detail, at a time the client attempts access again to the server, the client continuously attempts the access to the server during a time set by a user. That is, the client attempts the access to the server during a preset time in order to determine if the reason why the client and the server cannot communicate with each other is the simple communication interruptions. If the client attempts to have access to the server during the preset time but fails in accessing the server, the client determines that the information of the server has been changed. Accordingly, the client has access to the broker so as to obtain the changed information of the server, and receives the changed information of the server from the broker. Here, the changed information of the server denotes changed position information of a service module providing a specific service. That is, the changed information of the server is defined as including at least one of changed IP information, port information, and URL information of a service module.

If the client has access to the broker and receives the changed information of the server from the broker in block 206, in block 207, the client can have access to the server and seamlessly get the specific service from the server.

If it is determined in block 205 that the client has already gained access to the server, it means that the information of the server has not been changed and therefore, the client (i.e., terminal) can seamlessly get the specific service from the server using the previous information of the server.

Figure 3:
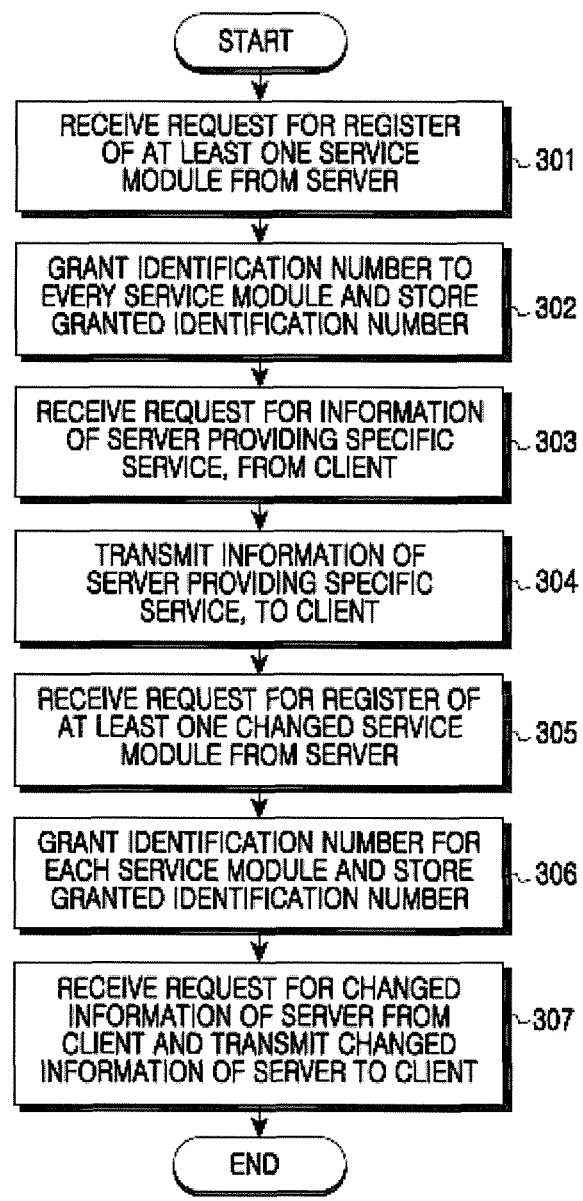
FIG. 3 is a flowchart illustrating an operation method of a broker for managing a service provided from a server according to an embodiment of the present disclosure.

FIG. 3 is a flowchart illustrating an operation method of a broker for managing a service provided from a server according to an embodiment of the present disclosure.

As illustrated in FIG. 3, in block 301, the broker receives a request for registering at least one service module from a server. In more detail, a client receives information of the server from the broker so as to get a specific service from the server. Accordingly, the broker receives the register of at least one service module from the server.

After the broker receives the request for register of at least one service module from the server in block 301, in block 302, the broker grants an identification number for each service module and stores the granted identification number. In more detail, if the broker receives the request of register of at least one service module from the server, the broker determines if the requested service module has been previously stored in the broker. If the broker determines that the at least one service module requested from the server has not been previously stored in the broker, the broker grants an identification number for each service module and stores the granted identification number. Here, the identification number that the broker grants the server for each service module includes position information of each service module and service information thereof. The position information of the service module includes at least one of IP information of the service module, port information thereof, and URL information thereof. The service information of the service module includes at least one of a title of a service provided by the service module, the content of the service, and a capacity of the service.

After that, in block 303, the broker receives a request for information of the server providing a specific service, from the client. In more detail, the client has knowledge of position information of a corresponding service module so as to get the specific service from the server. Accordingly, the client sends the broker the request for the server information that includes the position information of the specific service module and the service information thereof. That is, in the present disclosure, the broker can transmit the information of the server providing the specific service to the client, thereby being capable of reducing a load applied to the server.

If the broker receives, from the client, the request for the information of the server providing the specific service in block 303, in block 304, the broker transmits the information of the server providing the specific service, to the client. Here, the information of the server includes position information of a specific service module and service information thereof. That is, the information of the server is defined as including individual position information of each of one or more service modules stored in the server and individual service information thereof. Therefore, in the present disclosure, to get a specific service from the server, the client first has access to the broker and receives position information and service information about a service of interest from the broker. Of the information of the server, the position information is defined as including at least one of IP information of a service module, port information thereof, and URL information thereof. That is, port information and URL information of a service module that the client desires among several service modules stored in the server can differ, so the client cannot gain access to the service module until the client receives each information from the broker. Of the information of the server, the service information is defined as including a title of a service provided by a corresponding service module, the content of the service, a capacity of the service, and the like. That is, detailed items are included in a service module selected by the client, so the client can receive service information of the selected service module from the broker and confirm the content of a service of the selected service module in more detail.

If the information of the server is changed, in block 305, the broker receives a request for registering at least one changed service module from the server. In more detail, when the information of the server is changed, the client cannot have access to the changed service module and get a service of the changed service module, by the previous information of the server. As an example in which the information of the server is changed, there may be a situation where a service provider providing a corresponding service stops providing the service, or the service provider is changed, or a physical position of the server is changed. Here, the changed information of the server denotes changed position information of a service module providing a specific service. That is, the changed information of the server is defined as including at least one of changed IP information, port information, and URL information of the service module.

After the broker receives the request for the register of the changed at least one service module from the server in block 305, in block 306, the broker grants an identification number for each service module and stores the granted identification number. Here, the identification number that the broker newly grants the server for each service module includes changed position information of each service module and service information thereof. The changed position information of the service module includes at least one of changed IP information, port information, and URL information of the service module. The service information of the service module includes at least one of a title of a service provided by the service module, the content of the service, and a capacity of the service.

After that, in block 307, the broker receives a request for the changed information of the server from the client and, in response, the broker transmits the changed information of the server to the client. Accordingly, the client can receive the changed information of the server from the broker, and seamlessly get a service from the service module as previously described using the changed position information of the service module.

Figure 4:
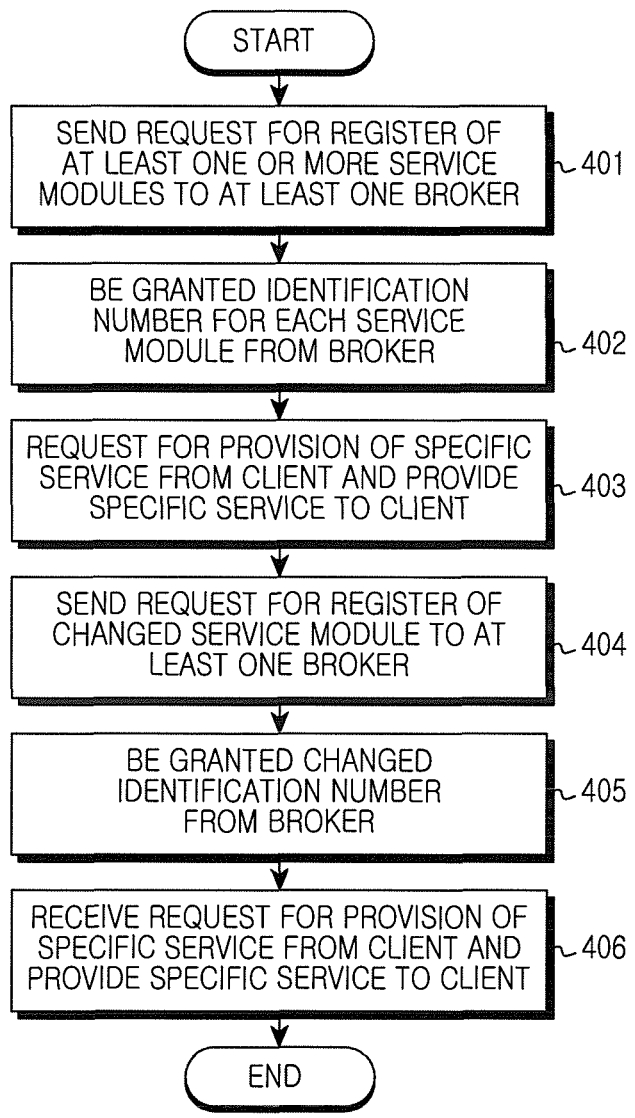
FIG. 4 is a flowchart illustrating an operation method of a server according to an embodiment of the present disclosure.

FIG. 4 is a flowchart illustrating an operation method of a server according to an embodiment of the present disclosure.

As illustrated in FIG. 4, first, in block 401, the server sends a request for registering one or more service modules to at least one broker. In the present disclosure, to get a specific service from the server, a client receives information of the server from the broker. Accordingly, the server registers the information of the server including information of a service module provided from the server, to the broker. That is, the aforementioned process is a precondition for the server to provide at least one service to the client.

After the server sends the request for the register of the one or more service modules to the broker in block 401, in block 402, the server is granted an identification number for each service module from the broker. In more detail, the reason why the server is granted the identification number for each service module from the broker is to allow the client to receive the information of the server from the broker as above and also, when a service provider intends to change the service module, to change the content of the service module stored in the broker using a corresponding identification number.

Next, in block 403, the server receives a request for a provision of a specific service from the client and, in response, provides the specific service to the client. Here, the specific service refers to various services provided by corresponding service modules. For example, the specific service may provide a file including a sound source, or provide a file including a moving picture, or provide a file including a photo. Also, the present disclosure registers the information of the server to the broker, so the client can receive, through the broker, detailed information of a service module provided from the server, thereby being capable of much reducing a load applied to the server.

Assuming that the information of the server is changed, in block 404, the server sends a request for registering a changed service module, to at least one broker. In more detail, when the information of the server is changed, the client cannot have access to the changed service module and get a service of the changed service module, by the previous information of the server. Accordingly, to store the changed information of the server in the broker, the server again registers the changed information of the server to the broker. As an example in which the information of the server is changed, there may be a situation where a service provider providing a corresponding service stops providing the service, or the service provider is changed, or a physical position of the server is changed. Here, the changed information of the server denotes changed position information of a service module providing a specific service. That is, the changed information of the server is defined as including at least one of changed IP information, port information, and URL information of the service module.

After the server sends the request for the register of the changed service module, to the broker in block 404, in block 405, the server is granted a changed identification number from the broker. Here, the identification number that the server is newly granted for each service module from the broker includes changed position information of each service module and service information thereof. The changed position information of the service module includes at least one of changed IP information, port information, and URL information of the service module. The service information of the service module includes at least one of a title of a service provided by the service module, the content of the service, and a capacity of the service.

Next, in block 406, the server receives a request for a provision of a specific service from the client and, in response, the server provides the specific service to the client. Here, the specific service refers to any of various services provided by corresponding service modules. For example, the specific service may provide a file including a sound source, or provide a file including a moving picture, or provide a file including a photo.

Figure 5:
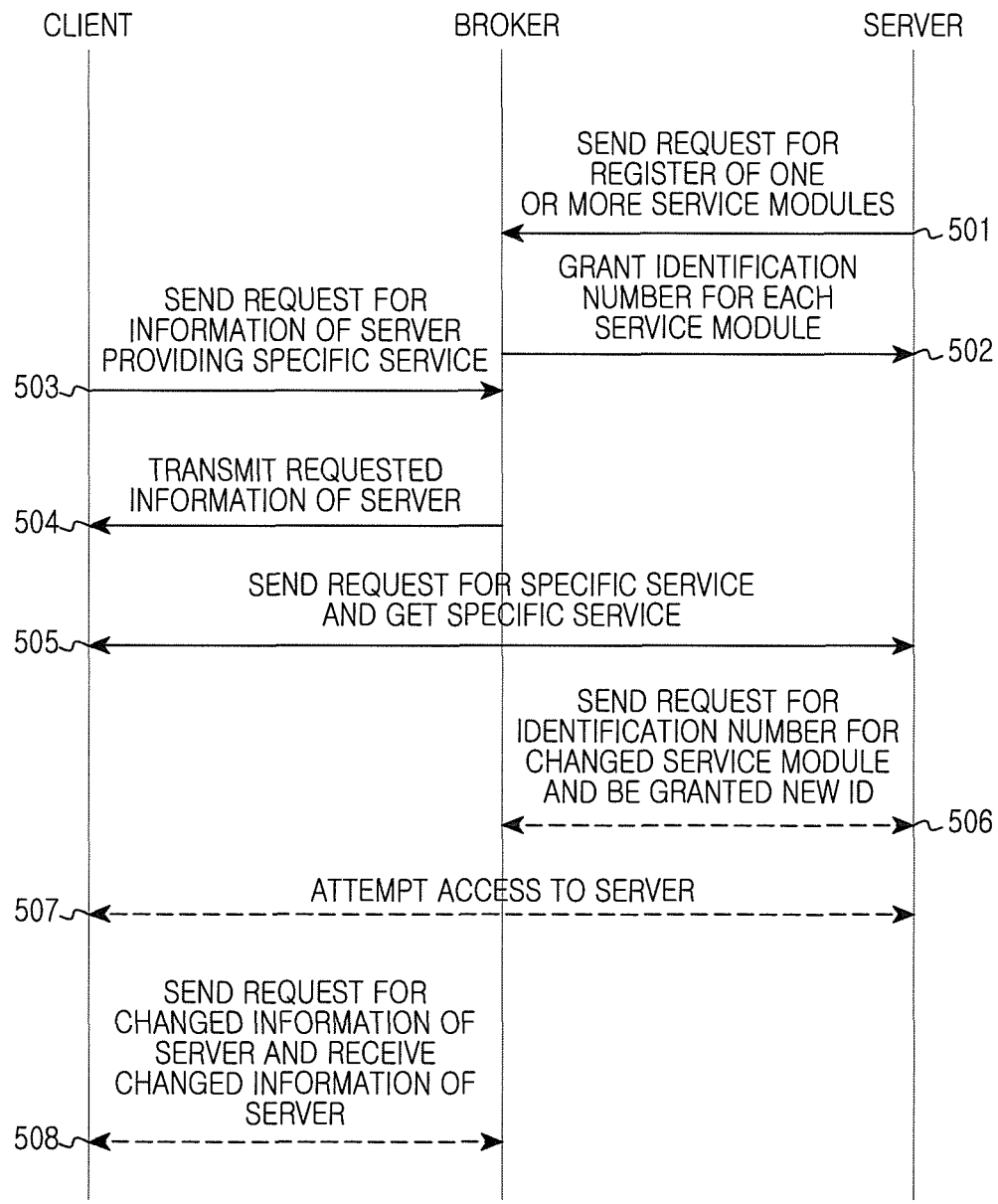
FIG. 5 is a ladder diagram illustrating operation flow of a client, a broker, and a server according to an embodiment of the present disclosure.

FIG. 5 is a ladder diagram illustrating an operation flow of a client, a broker, and a server according to an embodiment of the present disclosure.

As illustrated in FIG. 5, in block 501, the server sends a request for registering one or more service modules to the broker. In the present disclosure, to get a specific service from the server, the client receives information of the server from the broker. Accordingly, the server registers the information of the server including information of a service module provided from the server, to the broker. That is, the aforementioned process is a precondition for the server to provide at least one service to the client.

In block 502, the broker receiving the request for the register of the service module from the server grants the server an identification number for each service module. In more detail, if the broker receives the request for registering at least one service module from the server, the broker determines if the requested service module has been previously stored in the broker. If the broker determines that the at least one service module requested from the server has not been previously stored in the broker, the broker grants an identification number for each service module and stores the granted identification number. Here, the identification number that the broker grants the server for each service module includes position information of each service module and service information thereof. The position information of the service module includes at least one of IP information of the service module, port information thereof, and URL information thereof. The service information of the service module includes at least one of a title of a service provided by the service module, the content of the service, and a capacity of the service.

After that, in block 503, the client sends a request for information of the server providing a specific service, to the broker. In more detail, to get the specific service stored in the server from the server, the client sends the request for the information of the server to the broker. That is, in the conventional art, the client has access directly to the server and gets a specific service stored in the server from the server. In contrast, in the present disclosure, the broker has stored information about a specific service provided from the server and accordingly, to gain access to the server, the client first has access to the broker and sends a request for server information of interest to the broker.

If receiving the request for the information of the server providing the specific service from the client in block 503, in block 504, the broker transmits the requested information of the server to the client. Here, the information of the server includes position information of a specific service module and service information thereof. That is, the information of the server is defined as including individual position information of each of one or more service modules stored in the server and individual service information thereof. Therefore, in the present disclosure, to get a specific service from the server, the client first has access to the broker and receives position information and service information about a service of interest from the broker. Of the information of the server, the position information is defined as including at least one of IP information of a service module, port information thereof, and URL information thereof. That is, port information and URL information of a service module that the client desires among several service modules stored in the server can differ, so the client cannot gain access to the service module until receiving each information from the broker.

After that, in block 505, if the client sends a request for a specific service to the server, the client gets the specific service from the server. Here, the specific service refers to various services provided by corresponding service modules. For example, the specific service can provide a file including a sound source, or provide a file including a moving picture, or provide a file including a photo. Also, the present disclosure registers the information of the server to the broker, so the client can receive, through the broker, detailed information of a service module provided from the server, thereby being capable of substantially reducing a load applied to the server.

If the information of the server is changed, in block 506, the server sends a request for an identification number of a changed service module to the broker and gets a new identification number from the broker. Here, the identification number that the server is newly granted for each service module from the broker includes changed position information of each service module and service information thereof. The changed position information of the service module includes at least one of changed IP information, port information, and URL information of the service module. The service information of the service module includes at least one of a title of a service provided by the service module, the content of the service, and a capacity of the service.

After that, in block 507, the client attempts access to the server. If the client has access again to the server so as to get a specific service from the server, the client determines if it has already had access to the server. The reason why the client goes through the above determination process is to determine if information of the server providing the specific service has been changed. That is, when the client attempts access to the server, if the access to the server fails, the client determines if the failure reason is simple communication interruptions or is a change of the information of the server. For instance, when a service provider providing a corresponding service stops providing the service, or the service provider is changed, or a physical position of the server is changed, the access of the client to the server fails.

If it is determined that the client attempts the access to the server but the access to the server fails, in block 508, the client has access to the broker and receives the changed information of the server from the broker. In more detail, at a time the client attempts access again to the server, the client continuously attempts the access to the server during a time set by a user. That is, the client attempts the access to the server during a preset time in order to determine if the reason why the client and the server cannot communicate with each other is simple communication interruptions. If the client attempts to have access to the server during the preset time but fails in accessing the server, the client determines that the information of the server has been changed. Accordingly, the client has access to the broker so as to obtain the changed information of the server, and receives the changed information of the server from the broker. Here, the changed information of the server denotes changed position information of a service module providing a specific service. That is, the changed information of the server is defined as including at least one of changed IP information, port information, and URL information of a service module.

Table 1 below shows a communication protocol according to an embodiment of the present disclosure.

TABLE 1

```
<ECDataPackage size=". . .">
  <relationship sequence=". . .">
    <from type="client, broker, server. . ."id=". . .">. . .</from>
    <to type="client, broker, server. . ."id=". . .">. . .</to>
    <service _ info ip="port=". . .">
    <meta attr=". . ." value=". . ."/>
  <relationship>
  <databody>
    <data>. . .</data>
    <metadata>
      <meta attr=". . ." value=". . ."/> .
    </metadata>
    <additional _ info>
      <info attr=". . ." value=". . .">
        <data>. . .</data>
```

TABLE 1-continued

```
    </info>
    <additional _ info>
  <databody>
<ECDataPackage>
```

The "ECDataPackage" of line 1 represents a root element of a Data Package, and after the "size" is expressed the size of the "ECDataPackage".

Line 2 represents both constituent elements in which a Data Package is forwarded, and after the "sequence" is expressed Mapping data used for relaying data in a broker.

Line 3 represents a description of a constituent element sending a Data Package, the "type" means the type of the constituent element, and the "id" means an identification number of the constituent element.

Line 4 represents a description of a constituent element getting a Data Package and, similarly to line 3, the "type" means the type of the constituent element, and the "id" means an identification number of the constituent element.

As concrete examples of lines 3 and 4, <from type="broker "id= . . . "> . . . </from> and <to type="server "id= . . . "> . . . </to > are expressed, and represent that a broker sends specific data to a server using an arbitrary id.

Line 5 includes information about a service of a specific service module positioned in a server. Here, the "ip" means an IP address of the server in which a corresponding service exists, and the "port" means a port number in which a corresponding service is operating.

The "databody" of line 8 is a child element of the "ECDataPackage", and represents Data that is packed into a Data Package.

Line 9 represents a child element of the "databody/info", and represents data to be forwarded between constituent elements.

Line 10 represents a child element of the "databody", and represents additional information not capable of being expressed in data.

Line 11 represents a child element of the "metadata/relationship", and represents additional information. Here, the "attr" represents a name of the additional information, and the "value" represents data of the additional information.

Line 13 represents a child element of the "databody", and represents additional information not capable of being expressed in metadata. For example, it means information having a data type and other information.

Line 14 represents a child element of the "additional_info", and represents additional information. Here, the "attr" represents a name of the additional information, and the "value" represents data of the additional information.

Figure 6:
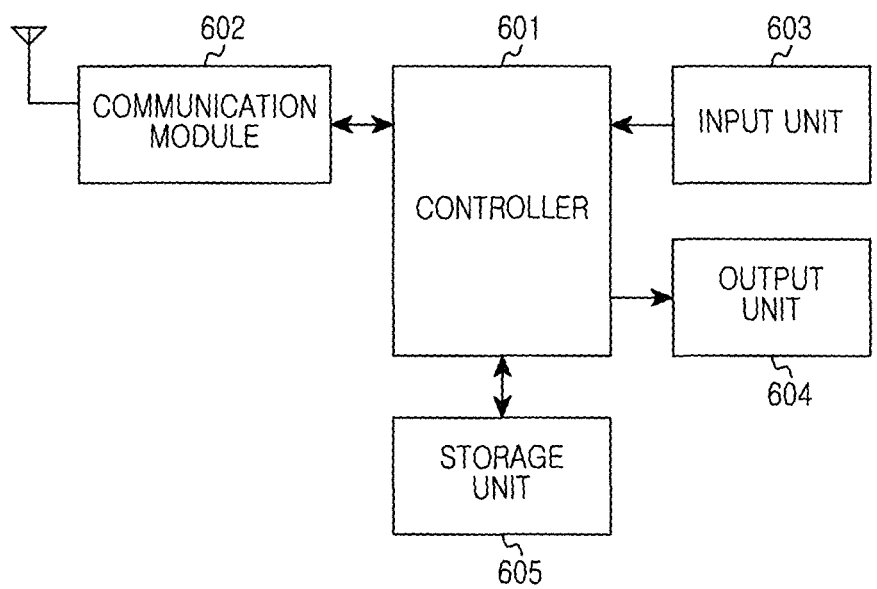
FIG. 6 is a block diagram illustrating a client (i.e., terminal) according to an embodiment of the present disclosure.

FIG. 6 is a block diagram illustrating a client (i.e., terminal) according to an embodiment of the present disclosure.

As illustrated in FIG. 6, the terminal according to the present disclosure can include a controller 601, a communication module 602, an input unit 603, an output unit 604, and a storage unit 605.

The controller 601 controls a general operation of the terminal. For instance, the controller 601 checks access or non-access with a server.

The communication module 602 processes a signal transmitted/received through an antenna for voice and data communication. For example, the communication module 602 sends a request for information of a server providing a specific service, to at least one broker and, in response to this, receives the information of the server from the broker, and sends a request for the specific service to the server. Also, the communication module 602 sends the broker a request for position information and service information of a service module providing a specific service among one or more service modules positioned within the server and each providing a different service. Also, the communication module 602 gets a specific service from the server and, to request the specific service, the communication module 602 attempts access to the server. Also, if it is determined that the access to the server fails, the communication module 602 attempts access to the server during a preset time and, if it is determined that the access to the server fails during the preset time, the communication module 602 sends a request for changed information of the server providing the specific service, to at least one broker and, in response to this, receives the changed information of the server from the broker.

The input unit 603 provides the controller 601 with input data generated by user's selection.

The output unit 604 displays status information of the terminal, a menu screen thereof, and story information thereof according to the control of the controller 601.

The storage unit 605 can be composed of a program storage unit for storing a program for controlling an operation of the terminal, and a data storage unit for storing data generated during program execution.

In the aforementioned block construction, the controller 601 can perform a general function of the portable terminal. In the present disclosure, these are separately constructed and shown to distinguish and describe respective functions. Thus, when a product is actually realized, construction can be such that the controller 601 can process all of the functions of the portable terminal, or construction can be such that the controller 601 can process only some of the functions.

Figure 7:
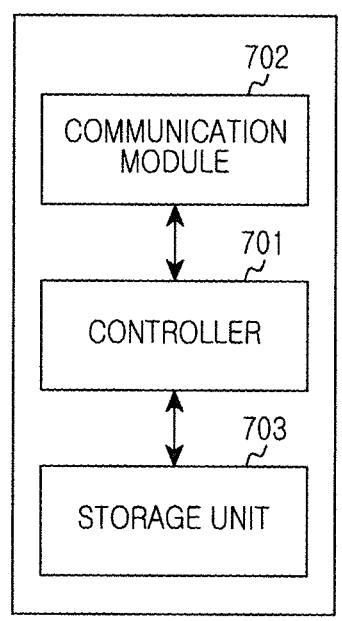
FIG. 7 is a block diagram illustrating a broker according to an embodiment of the present disclosure.

FIG. 7 is a block diagram illustrating a broker according to an embodiment of the present disclosure.

As illustrated in FIG. 7, the broker according to the present disclosure can be composed of a controller 701, a communication module 702, and a storage unit 703.

The controller 701 controls a general operation of the broker. For instance, the controller 701 determines if a requested service module has been registered to the broker and, if it is determined that the requested service module has not been registered to the broker, the controller 701 grants a server an identification number for each service module. Also, the controller 701 receives a request for registering changed information of the server from the server and, if it is determined that a service module has not been registered, the controller 701 grants the server a new identification number for each service module.

The communication module 702 receives a request for information of a server providing a specific service, from a terminal and, in response to this, transmits the information of the server to the terminal, and receives a request for registering of one or more service modules from the server. Also, the communication module 702 receives a request for changed information of the server providing the specific service, from the terminal and, in response to this, transmits the changed information of the server to the terminal.

The storage unit 703 can be composed of a program storage unit for storing a program for controlling an operation of the broker and a data storage unit for storing data generated during program execution.

In the aforementioned block construction, the controller 701 can perform a general function of the broker. In the present disclosure, these are separately constructed and shown to distinguish and describe respective functions. Thus, when a product is actually realized, construction can be such that the controller 701 can process all of the functions of the portable terminal, or construction can be such that the controller 701 can process only some of the functions.

Figure 8:
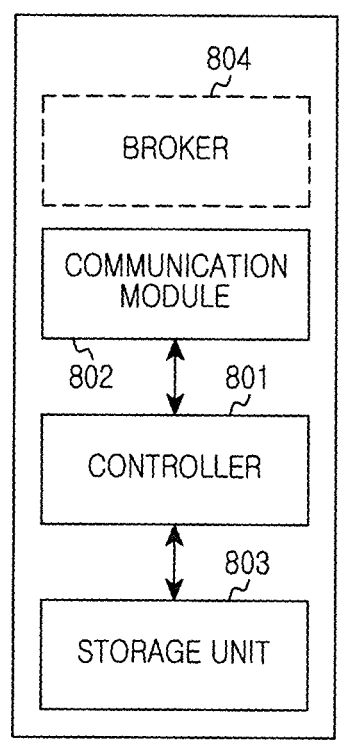
FIG. 8 is a block diagram illustrating a server according to an embodiment of the present disclosure.

FIG. 8 is a block diagram illustrating a construction of a server according to an embodiment of the present disclosure.

As illustrated in FIG. 8, the server of the present disclosure can include a controller 801, a communication module 802, a storage unit 803, and a broker 804.

The controller 801 controls a general operation of the server.

The communication module 802 processes a signal transmitted/received through an antenna for voice and data communication. For example, the communication module 802 transmits server information about a specific service provided from the server, to at least one broker, and receives a request for provision of the specific service from the terminal and, in response to this, provides the specific service to the terminal. Also, the communication module 802 sends a request for registering one or more service modules to the broker and is granted an identification number for each service module from the broker.

The storage unit 803 can be composed of a program storage unit for storing a program for controlling an operation of the server and a data storage unit for storing data generated during program execution.

The broker 804 is positioned inside the server or is positioned outside the server, and stores position information of one or more service modules and service information thereof.

In the aforementioned block construction, the controller 801 can perform a general function of the server. In the present disclosure, these are separately constructed and shown to distinguish and describe respective functions. Thus, when a product is actually realized, construction can be such that the controller 801 can process all of the functions of the portable terminal, or construction can be such that the controller 801 can process only some of the functions.

It will be appreciated that embodiments of the present disclosure according to the claims and description in the specification can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present disclosure.

Accordingly, embodiments provide a program comprising code for implementing an apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the disclosure has been shown and described with reference to certain preferred embodiments thereof, it will be understood by those skilled in the art that various changes in form and details may be made therein without departing from the spirit and scope of the disclosure as defined by the appended claims.

What is claimed is:

1. An operation method of a terminal, the method comprising:
   sending, to at least one broker, a request for information of a server providing a specific service by sending an information request for each position information and service information of a plurality of service modules, each of the plurality of service modules providing a respective specific service, wherein the plurality of service modules are positioned inside the server, and wherein each of the plurality of service modules provides a different service;
   receiving the information of the server from the at least one broker;
   sending a different request for the specific service to the server using the information of the server,
   attempting access to the server in order to send the request for the specific service to the server;
   checking whether an access or non-access with the server occurs;
   if it is determined that the access to the server fails, attempting the access to the server during a preset time;
   if it is determined that the access to the server fails during the preset time, sending a request for changed information of the server providing the specific service to the at least one broker; and
   receiving the changed information of the server from the at least one broker,
   wherein the changed information of the server comprises changed position information of a service module providing the respective specific service, and
   wherein each position information, service information and identification information of the plurality of service modules that are positioned, added or deleted inside the server are granted and updated by the at least one broker and wherein the identification information is generated by the at least one broker and includes the position information and the service information.

2. The method of claim 1, wherein the terminal, the at least one broker, and the server use a same communication protocol.

3. The method of claim 1, wherein the at least one broker and the server use a same type of communication module.

4. The method of claim 1, wherein the at least one broker is positioned inside the server or outside the server and is configured to store the position information of one or more service modules and the service information thereof.

5. The method of claim 1, wherein the information of the server comprises position information of a service module providing the specific service and service information thereof.

6. The method of claim 4, wherein the position information comprises at least one of: Internet Protocol (IP) information of the service module, port information thereof, and Uniform Resource Locator (URL) information thereof.

7. The method of claim 4, wherein the service information comprises at least one of: a title of a service provided by the service module, a content of the service, and a capacity of the service.

8. The method of claim 1, further comprising receiving the specific service from the server.

9. The method of claim 1, wherein the changed position information comprises at least one of: IP information of the service module, port information thereof, and URL information thereof.

10. An apparatus of a terminal, the apparatus comprising:
    a communication module configured to:
      send a request for information of a server providing a specific service to at least one broker by sending an information request for each position information and service information of a plurality of service modules, each service module providing a respective specific service, wherein each of the plurality of service modules is positioned inside the server and provides a different service,
      receive the information of the server from the at least one broker, and
      send a request for the specific service to the server; and
    a controller configured to control a general operation of the terminal,
    wherein the communication module is configured to attempt access to the server in order to send the request for the specific service to the server, and the controller is configured to check whether an access or non-access with the server occurs,
    wherein, if it is determined that the access to the server fails, the communication module is configured to attempt the access to the server during a preset time and, if it is determined that the access to the server fails during the preset time, the communication module is configured to:
      send a request for changed information of the server providing the specific service to the at least one broker, and
      receive the changed information of the server from the at least one broker,
    wherein the changed information of the server comprises changed position information of a service module providing the respective specific service, and
    wherein each position information, service information and identification information of the plurality of service modules that are positioned, added or deleted inside the server are granted and updated by the at least one broker and wherein the identification information is generated by the at least one broker and includes the position information and the service information.

11. The apparatus of claim 10, wherein the terminal, the at least one broker, and the server are configured to use a same communication protocol.

12. The apparatus of claim 10, wherein the at least one broker and the server are configured to use a same type of communication module.

13. The apparatus of claim 10, wherein the at least one broker is positioned inside the server or outside the server and is configured to store the position information of one or more service modules and the service information thereof.

14. The apparatus of claim 10, wherein the information of the server comprises position information of a service module providing the specific service and service information thereof.

15. The apparatus of claim 13, wherein the position information comprises at least one of: Internet Protocol (IP)

information of the service module, port information thereof, and Uniform Resource Locator (URL) information thereof.

16. The apparatus of claim 13, wherein the service information comprises at least one of: a title of a service provided by the service module, a content of the service, and a capacity of the service.

17. The apparatus of claim 10, wherein the communication module is configured to receive the specific service from the server.

18. The apparatus of claim 10, wherein the changed position information comprises at least one of: IP information of the service module, port information thereof, and URL information thereof.

* * * * *